US012734734B2

(12) United States Patent
Park et al.

(10) Patent No.: US 12,734,734 B2
(45) Date of Patent: Sep. 15, 2026

(54) PLASTIC COMPOSITE MATERIAL MOLDED STRUCTURE

(71) Applicants: Hyundai Motor Company, Seoul (KR); Kia Corporation, Seoul (KR); KOLON SPACEWORKS CO., LTD., Gyeongsangnam-do (KR)

(72) Inventors: Youjin Park, Hwaseong-si (KR); Jae Young Lee, Hwaseong-si (KR); Jaeseon Yu, Hwaseong-si (KR); Jae Kuk Park, Seoul (KR); Chang Hee Lee, Seoul (KR); Sung Wook Kim, Seoul (KR)

(73) Assignees: Hyundai Motor Company, Seoul (KR); Kia Corporation, Seoul (KR); KOLON SPACEWORKS CO., LTD., Gunbuk-Myeon (KR)

( * ) Notice: Subject to any disclaimer, the term of this patent is extended or adjusted under 35 U.S.C. 154(b) by 196 days.

(21) Appl. No.: 18/897,119

(22) Filed: Sep. 26, 2024

(65) Prior Publication Data

US 2025/0196407 A1 Jun. 19, 2025

(30) Foreign Application Priority Data

Dec. 13, 2023 (KR) ........................ 10-2023-0180921

(51) Int. Cl.
*B29C 43/42* (2006.01)
*B29C 43/02* (2006.01)
*B29K 75/00* (2006.01)
*B29L 31/30* (2006.01)

(52) U.S. Cl.
CPC ............ *B29C 43/42* (2013.01); *B29C 43/021* (2013.01); *B29C 2043/026* (2013.01); *B29K 2075/00* (2013.01); *B29L 2031/3005* (2013.01)

(58) Field of Classification Search
CPC . B29C 43/42; B29C 43/021; B29C 2043/026; B29K 2075/00; B29L 2031/3005
USPC ............................................................ 428/99
See application file for complete search history.

(56) References Cited

U.S. PATENT DOCUMENTS

2010/0128470 A1* 5/2010 Swan ........................ F21L 4/04 362/157
2017/0348918 A1* 12/2017 Barrenscheen ..... B29C 45/1676
2025/0196407 A1* 6/2025 Park ...................... B29C 43/021

* cited by examiner

*Primary Examiner* — Betelhem Shewareged
(74) *Attorney, Agent, or Firm* — Slater Matsil, LLP

(57) ABSTRACT

An embodiment plastic composite material molded structure configured to be fastened to a correlated component by a fastening member is provided. The plastic composite material molded structure includes a molded main body including a composite material molding source molded into a predetermined shape by a press mold, a boss portion protruding from the molded main body, and an injection member made of a plastic material, the injection member being inserted and fixed in the boss portion by a mold pin and having an undercut disposed to be fastened to the fastening member.

20 Claims, 6 Drawing Sheets

PLASTIC COMPOSITE MATERIAL MOLDED STRUCTURE

CROSS-REFERENCE TO RELATED APPLICATIONS

This application claims the benefit of Korean Patent Application No. 10-2023-0180921, filed on Dec. 13, 2023, which application is hereby incorporated herein by reference.

TECHNICAL FIELD

The present invention relates to a plastic composite material molded structure.

BACKGROUND

In general, a plurality of panels are assembled into a vehicle body. Examples of the panel include a side outer panel, a roof panel, and a hood panel.

The panels are manufactured by molding a blank made of a steel material with a press mold.

However, in the case of such a molding method, it takes a long time to develop the press mold and excessive development cost may be incurred. Furthermore, a painting process is required to paint press-molded panels made of a steel material.

Accordingly, recently, a molding technique for plastic composite material panels is being introduced which is advantageous for small-volume production of panels, enables reduction in weight of a vehicle, and does not require painting.

A plastic composite material panel may be manufactured by molding a molding source of a plastic composite material into a predetermined shape by a press molding machine.

The plastic composite material panel as described above may be assembled to a correlated component (for example, a vehicle body) through fastening members such as clips.

To this end, the plastic composite material panel is provided with a boss portion for attaching and detaching clips. The boss portion is formed in a shape that enables clips to be attached and detached (for example, a shape with a predetermined height).

However, when molding a plastic composite material panel using the press molding method, it is difficult or impossible to apply an undercut to the boss portion for attaching and detaching clips.

Due to this, there is no other choice but to use clips made of a plastic material as fastening members, which is however disadvantageous in terms of fastening strength between the plastic composite material panel and the correlated component.

Therefore, only clips made of a metal material and having a protrusion shape can be used as fastening members. However, this limits the use of the plastic composite material panel and may cause incomplete molding or poor molding of the boss portion for attaching and detaching clips made of a metal material.

To improve the above situations, a method of forming holes in the plastic composite material panel and fastening clips to the correlated component through the holes may be applied. However, this method imposes significant limitations on the use of clips because the formation locations of the holes are limited.

The matters described in the background section are prepared to enhance understanding of the background of embodiments of the invention and may include matters that are not already known.

SUMMARY

The present invention relates to a plastic composite material molded structure. Particular embodiments relate to a plastic composite material molded structure such as a panel component.

An embodiment of the present invention provides a plastic composite material molded structure that enables a clip made of a plastic material as a fastening member to be used and poor molding to be minimized.

A plastic composite material molded structure according to an embodiment of the present invention can be fastened to a correlated component by a fastening member and may include i) a molded main body made of a composite material molding source and molded into a predetermined shape by a press mold, ii) at least one boss portion protruding from the molded main body, and iii) an injection member made of a plastic material, inserted and fixed in the at least one boss portion by a mold pin and having an undercut formed to be fastened to the fastening member.

In addition, in the plastic composite material molded structure according to an embodiment of the present invention, the injection member may include an upper portion including the undercut and a fastening hole into which the mold pin is to be fitted, a middle portion extending from the upper portion and having an inner space connected to the fastening hole, and a lower portion extending from the middle portion and having a fitting groove into which the mold pin is to be fitted.

In addition, in the plastic composite material molded structure according to an embodiment of the present invention, the undercut may be formed at an edge portion of the fastening hole.

In addition, in the plastic composite material molded structure according to an embodiment of the present invention, the mold pin including a first pin portion and a second pin portion connected to each other may be fitted into the fastening hole.

In addition, in the plastic composite material molded structure according to an embodiment of the present invention, an inner diameter D1 of the inner space may be greater than an inner diameter D2 of the fastening hole, and an inner diameter D3 of the fitting groove may be smaller than the inner diameter D2 of the fastening hole.

In addition, in the plastic composite material molded structure according to an embodiment of the present invention, the first pin portion having an outer diameter d1 greater than the inner diameter D2 of the fastening hole may be fitted into the fastening hole.

In addition, in the plastic composite material molded structure according to an embodiment of the present invention, the second pin portion having an outer diameter d2 smaller than the outer diameter d1 of the first pin portion and greater than the inner diameter D3 of the fitting groove may be fitted into the fitting groove.

In addition, in the plastic composite material molded structure according to an embodiment of the present invention, the composite material molding source may be a thermosetting material including a fiber material.

In addition, in the plastic composite material molded structure according to an embodiment of the present invention, the injection member may include a thermoplastic plastic material.

In addition, in the plastic composite material molded structure according to an embodiment of the present invention, the fastening member including a clip made of a plastic material may be fastened to the undercut.

In addition, the plastic composite material molded structure according to an embodiment of the present invention may include a hood panel.

The plastic composite material molded structure according to an embodiment of the present invention can be manufactured into various components by a press molding method and can enable incomplete molding or poor molding of the boss portion to be minimized.

In addition, the effects that can be obtained or expected by the embodiments of the present invention will be directly or implicitly disclosed in the detailed description of the embodiments of the present invention. That is, various effects that may be expected by the embodiments of the present invention will be disclosed in the detailed description described below.

BRIEF DESCRIPTION OF THE DRAWINGS

Since the accompanying drawings are for reference in describing embodiments of the present invention, the technical spirit of the present invention should not be construed as being limited to the accompanying drawings.

It should be understood that the above-referenced drawings are not necessarily drawn to scale, and they present rather simplified representations of various preferred features illustrating the basic principles of embodiments of the present invention. For example, the specific design features of embodiments of the present invention, including, for example, specific dimensions, orientations, locations, and shapes, will be determined in part by the specific intended application and use environment.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing specific embodiments only and is not intended to be limiting of the present disclosure. As used herein, the singular forms are intended to include the plural forms as well, unless the context clearly indicates otherwise.

It will be further understood that the terms "comprise" and/or "comprising" when used in this specification specify the presence of stated features, integers, steps, operations, elements, and/or components, but they do not preclude the presence or addition of one or more other features, integers, steps, operations, components, and/or groups thereof.

As used herein, the term "and/or" includes any one or all combinations of one or more of associated listed items.

In the present specification, the term "coupled" indicates a physical relationship between two components in which the components are directly connected to each other or indirectly connected through one or more intermediate components.

As used herein, "vehicle," "vehicular," "automobile," or other similar terms used herein generally refer to passenger automobiles including passenger vehicles, sport utility vehicles (SUVs), buses, trucks, and various commercial vehicles, and include hybrid vehicles, electric vehicles, hybrid electric vehicles, electric vehicle-based purpose built vehicles (PBVs), hydrogen-powered vehicles, and other alternative fuel vehicles (for example, fuels derived from resources other than petroleum).

Hereinafter, embodiments of the present invention will be described in detail with reference to the accompanying drawings.

Figure 1:
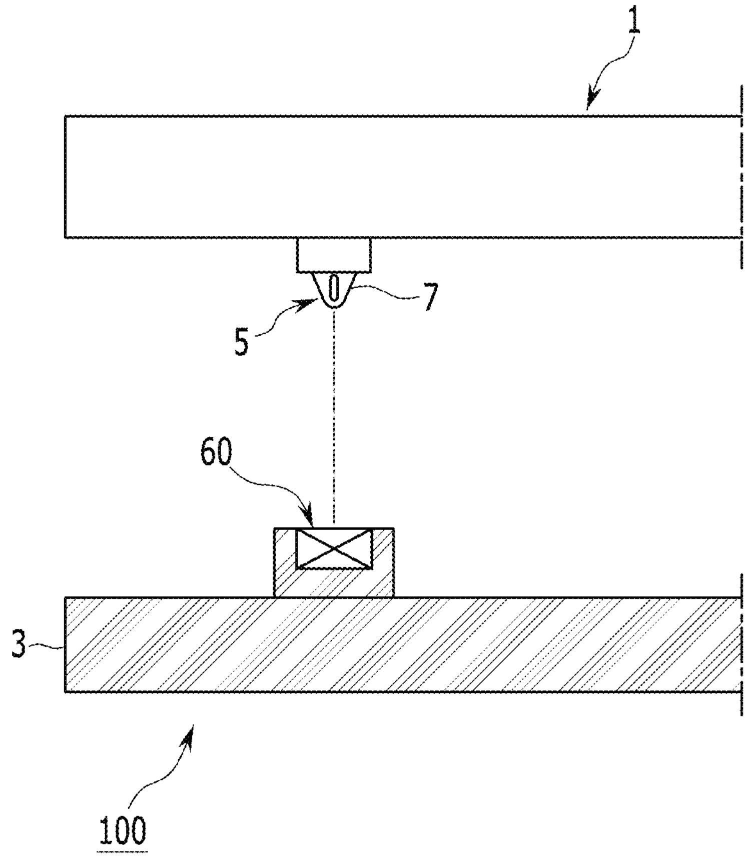
FIG. 1 is a view schematically showing an application example of a plastic composite material molded structure according to an embodiment of the present invention.

FIG. 1 is a view schematically showing an application example of a plastic composite material molded structure according to an embodiment of the present invention.

Referring to FIG. 1, a plastic composite material molded structure 100 according to an embodiment of the present invention may be a panel component 3 that is assembled to a correlated component 1 (for example, a vehicle body). For example, the panel component 3 may include a hood panel of a vehicle.

The plastic composite material molded structure 100 according to an embodiment of the present invention may be fastened to the correlated component 1 by a fastening member 5 coupled to the correlated component 1. The fastening member 5 may include, in an example, a clip 7.

Figure 2:
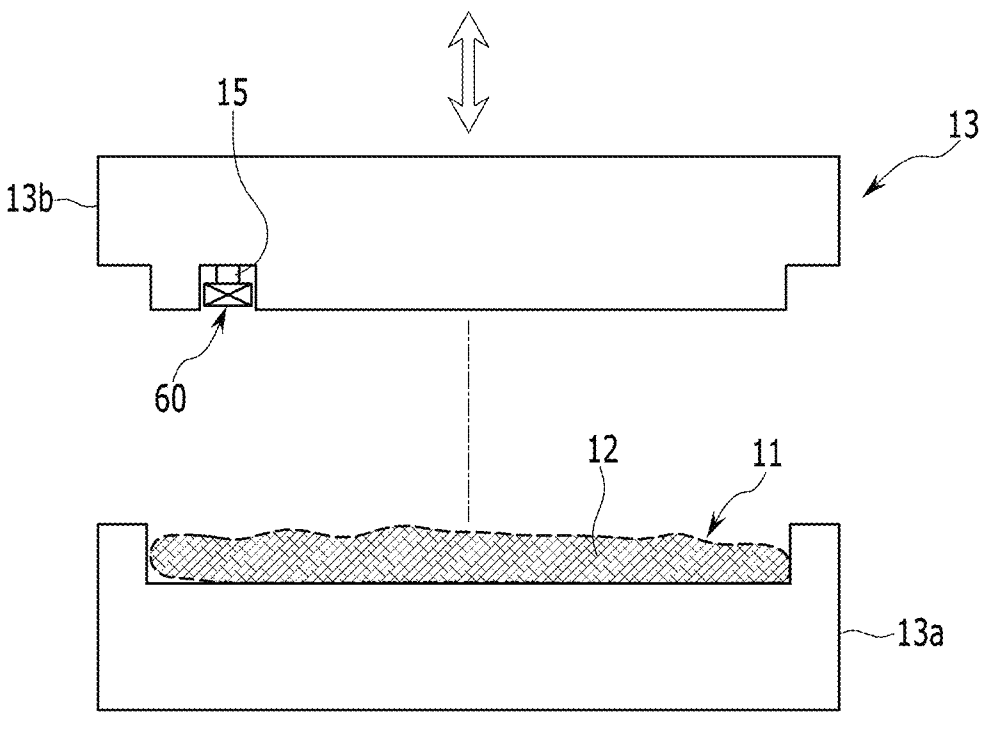
FIG. 2 is a view schematically showing an example of manufacturing a plastic composite material molded structure according to an embodiment of the present invention.

FIG. 2 is a view schematically showing an example of manufacturing a plastic composite material molded structure according to an embodiment of the present invention.

Referring to FIGS. 1 and 2, the plastic composite material molded structure 100 according to an embodiment of the present invention may be manufactured by molding a composite material molding source 11 into a predetermined shape by a press mold 13.

The composite material molding source 11 may be a thermosetting material including a fiber material 12 and a thermosetting resin. The fiber material 12 may include, for example, one or more of carbon fiber, glass fiber, and aramid fiber.

The composite material molding source 11 may include a polyurethane compound. Such a composite material molding source 11 is well-known to one skilled in the art, and detailed description thereof will be omitted.

Here, the press mold 13 includes a mold pin 15 adapted to insert a separate insert (for example, an injection member 60 according to an embodiment of the present invention, which will be described below) into the composite material molding source 11.

The mold pin 15 can insert the insert into the composite material molding source 11 while securing the insert during an operation of the press mold 13.

In the present specification, 'upper end portion,' 'upper portion,' 'upper end,' or 'upper surface' of a constitutional element indicates an end portion, a portion, an end, or a surface of a constitutional element located on a relatively upper side in the drawing, and 'lower end portion,' 'lower portion,' 'lower end,' or 'lower surface' of a constitutional element indicates an end portion, a portion, an end, or a surface of a constitutional element located on a relatively lower side in the drawing.

Furthermore, in the present specification, an end of a constitutional element (for example, one-side end or other-side end, both ends, or the like) refers to an end of a constitutional element in any one direction, and an end portion of a constitutional element (for example, one-side end portion, other-side end portion, both end portions, front end portion, rear end portion, or the like) indicates a certain portion of a constitutional element that includes the end.

Unlike the related art, the plastic composite material molded structure 100 according to an embodiment of the present invention provides a structure that can enable the clip 7 made of a plastic material to be used as the fastening member 5 and poor molding to be minimized.

Figure 3:
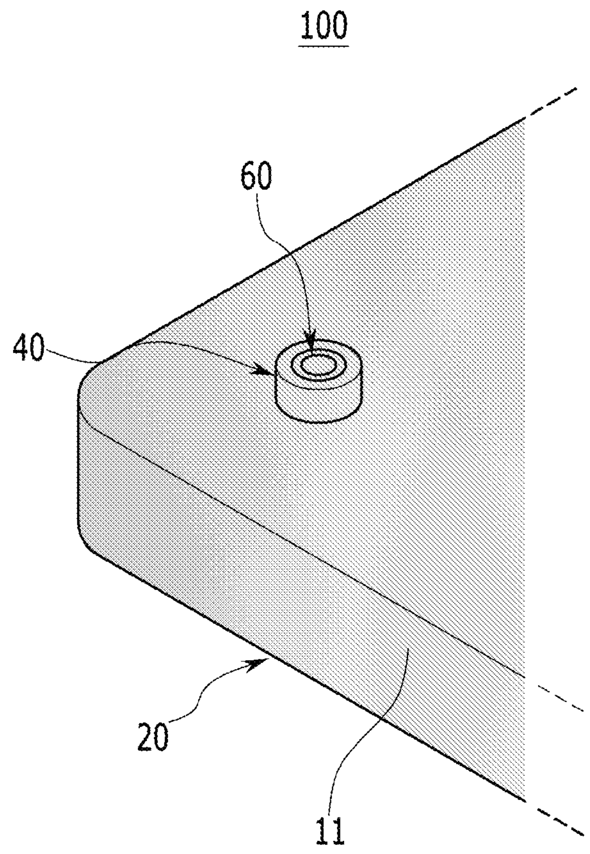
FIG. 3 is a perspective view showing a plastic composite material molded structure according to an embodiment of the present invention.
Figure 4:
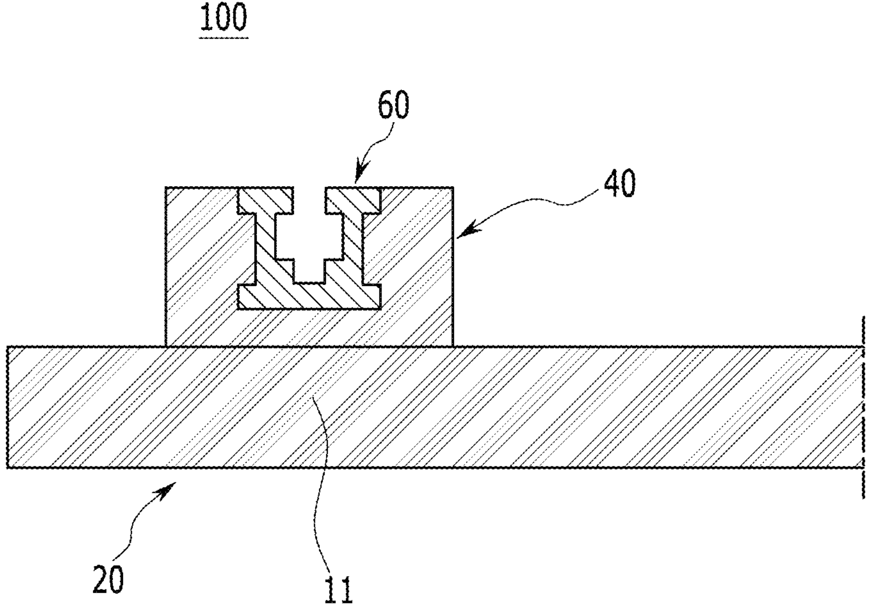
FIG. 4 is a cross-sectional view showing the plastic composite material molded structure according to an embodiment of the present invention.

FIG. 3 is a perspective view showing a plastic composite material molded structure according to an embodiment of the present invention, and FIG. 4 is a cross-sectional view showing the plastic composite material molded structure according to an embodiment of the present invention.

Referring to FIGS. 1 to 4, the plastic composite material molded structure 100 according to an embodiment of the present invention includes a molded main body 20, at least one boss portion 40, and an injection member 60.

In an embodiment of the present invention, the molded main body 20 is made of the composite material molding source 11 and can be molded into a predetermined shape by the press mold 13. In an example, the molded main body 20 may be provided as a panel main body of the panel component 3 (e.g., the hood panel).

In an embodiment of the present invention, at least one boss portion 40 protrudes upward from the molded main body 20 by a predetermined height, based on the drawing.

At least one boss portion 40 may be molded to have a predetermined height together with the molded main body 20 by the press mold 13.

In an embodiment of the present invention, the injection member 60 may be provided as the insert described above. When the press mold 13 is operated, the injection member 60 is inserted into the boss portion 40 by the mold pin 15 and may be fixed in the boss portion 40.

Then, the injection member 60 may be fastened with the clip 7 made of a plastic material as the fastening member 5.

The injection member 60 can be manufactured by injection molding a plastic material using an injection machine, which is well known to one skilled in the art. In an example, the injection member 60 may be formed of a thermoplastic plastic material.

Figure 5:
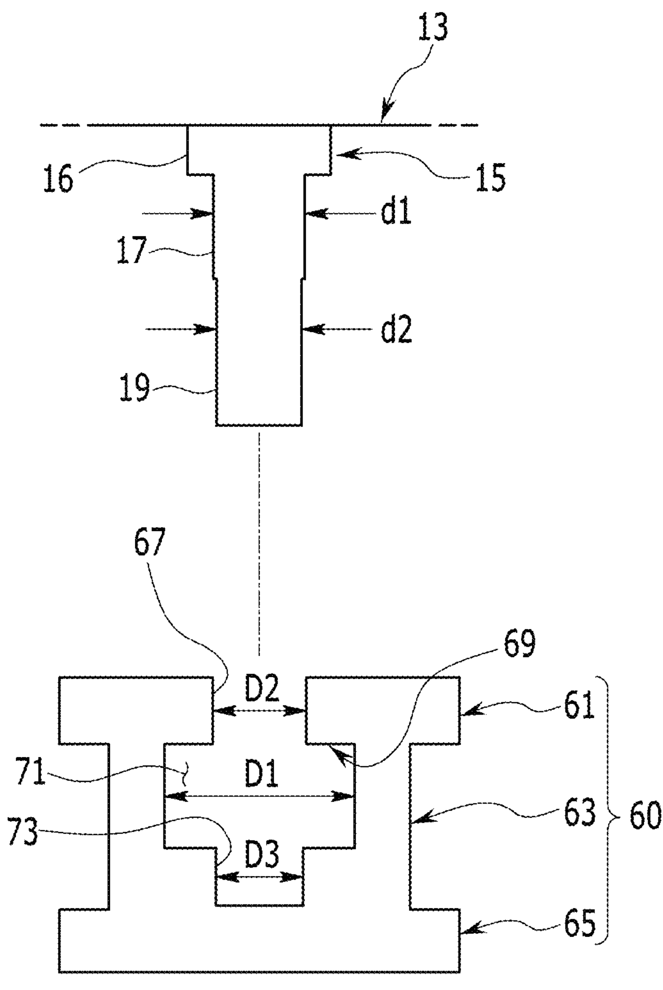
FIG. 5 is a cross-sectional view showing an example of an injection member that is applied to a plastic composite material molded structure according to an embodiment of the present invention.
Figure 6:
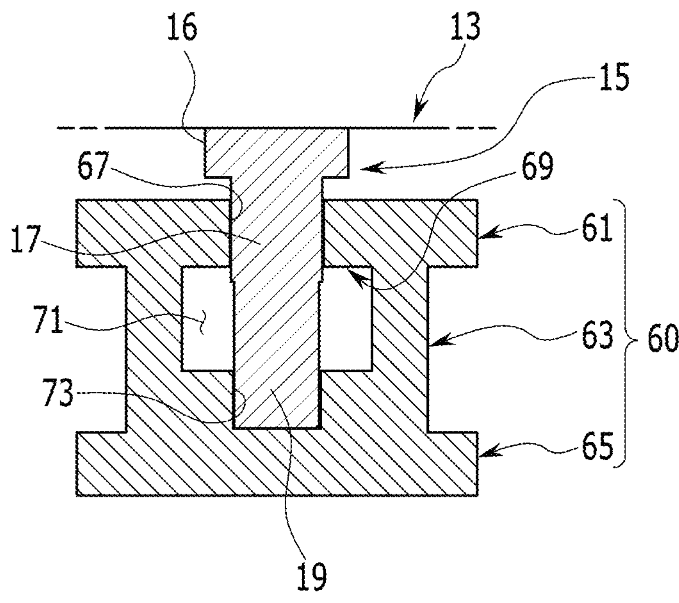
FIG. 6 is a cross-sectional view showing a coupled structure of an injection member and a mold pin, which are applied to a plastic composite material molded structure according to an embodiment of the present invention.

FIG. 5 is a cross-sectional view showing an example of an injection member that is applied to a plastic composite material molded structure according to an embodiment of the present invention, and FIG. 6 is a cross-sectional view showing a coupled structure of an injection member and a mold pin, which are applied to a plastic composite material molded structure according to an embodiment of the present invention.

Referring to FIGS. 5 and 6, the injection member 60 according to an embodiment of the present invention includes an upper portion 61, a middle portion 63, and a lower portion 65, which are connected to one another.

The upper portion 61 includes a fastening hole 67 into which the mold pin 15 can be fitted and an undercut 69 to which the clip 7 (see FIG. 1) as the fastening member 5 can be fastened.

The mold pin 15 and the clip 7 can be fitted into the fastening hole 67 in an upper-lower direction. The undercut 69 is formed at an edge portion of the fastening hole 67.

The middle portion 63 extends downward from the upper portion 61. The middle portion 63 includes an inner space 71 connected to the fastening hole 67 of the upper portion 61.

The lower portion 65 extends downward from the middle portion 63. The lower portion 65 includes a fitting groove 73 into which the mold pin 15 can be fitted. The fitting groove 73 is connected to the inner space 71 of the middle portion 63.

Here, the mold pin 15 may include a head portion 16 that is fixed to a die of the press mold 13, a first pin portion 17 connected to the head portion 16, and a second pin portion 19 connected to the first pin portion 17.

The second pin portion 19 of the mold pin 15 may pass through the fastening hole 67 and the inner space 71 in a downward direction and be fitted into the fitting groove 73. Then, the first pin portion 17 of the mold pin 15 may be fitted into the fastening hole 67.

Below, a detailed configuration of the injection member 60 and a coupled structure of the injection member 60 and the mold pin 15 will be described in detail.

In an embodiment of the present invention, an inner diameter D1 of the inner space 71 is greater than an inner diameter D2 of the fastening hole 67. An inner diameter D3 of the fitting groove 73 is smaller than the inner diameter D2 of the fastening hole 67.

Here, the first pin portion 17 of the mold pin 15 has an outer diameter d1 greater than the inner diameter D2 of the fastening hole 67 and is fitted into the fastening hole 67. The first pin portion 17 may be coupled to the fastening hole 67 in an interference fit manner. Accordingly, the upper portion 61 of the injection member 60 may be secured to the first pin portion 17 of the mold pin 15.

The second pin portion 19 has an outer diameter d2 smaller than the outer diameter d1 of the first pin portion 17 and greater than the inner diameter D3 of the fitting groove 73 and is fitted into the fitting groove 73. The second pin portion 19 may be coupled to the fitting groove 73 in an interference fit manner. Accordingly, the lower portion 65 of the injection member 60 may be secured to the second pin portion 19 of the mold pin 15.

Therefore, when the press mold 13 (see FIG. 2) is operated, the injection member 60 can be inserted into the boss portion 40 (see FIG. 4) while being secured to the first pin portion 17 and the second pin portion 19 of the mold pin 15.

That is, the injection member 60 can be inserted into the boss portion 40 without being shaken by external force when the press mold 13 (see FIG. 2) is operated.

The shape and configuration of the injection member 60 as described above are not limited to the above and can be changed depending on various shapes of the mold pin 15.

Below, the manufacturing process and operation of the plastic composite material molded structure 100 according to an embodiment of the present invention configured as described above will be described in detail with reference to FIGS. 1 to 6.

First, in an embodiment of the present invention, the composite material molding source 11 in the form of a gel is injected into a lower mold 13*a* of the press mold 13.

At this time, an upper mold 13*b* of the press mold 13 is in a state of being moved upward. The upper mold 13*b* is equipped with the mold pin 15, and the injection member 60 made of a plastic material is secured to the first pin portion 17 and the second pin portion 19 of the mold pin 15.

Then, when the upper mold 13*b* of the press mold 13 is moved downward and joined with the lower mold 13*a*, the molded main body 20 having a predetermined shape and at least one boss portion 40 are molded by flow of the composite material molding source 11.

During such a process, the injection member 60 secured to the mold pin 15 is inserted into the boss portion 40.

Here, the first pin portion 17 of the mold pin 15 is coupled to the fastening hole 67 of the injection member 60, and the second pin portion 19 is coupled to the fitting groove 73 of the injection member 60.

Accordingly, even if external force acts on the injection member 60, the injection member 60 can be inserted into the boss portion 40 without being shaken or misaligned on the mold pin 15.

Then, when the composite material molding source 11 is cured, the injection member 60 is fixed in the boss portion 40. Then, the upper mold 13*b* of the press mold 13 is released from the lower mold 13*a*.

Then, as the upper mold 13*b* is released in a state in which the injection member 60 is fixed in the boss portion 40, the mold pin 15 is separated from the injection member 60.

Therefore, the manufacturing of the plastic composite material molded structure 100 according to an embodiment of the present invention in which the injection member 60 made of a plastic material is inserted in the boss portion 40 of the molded main body 20 is completed through the series of processes as described above.

According to the plastic composite material molded structure 100 according to an embodiment of the present invention as described so far, the clip 7 made of a plastic material can be fastened to the injection member 60 made of a plastic material inserted in the boss portion 40.

Here, the clip 7 in a state of being fixed to the correlated component 1 can be fitted into the fastening hole 67 of the injection member 60 and fastened to the undercut 69.

Accordingly, the plastic composite material molded structure 100 according to an embodiment of the present invention can be assembled with the correlated component 1 by the clip 7 made of a plastic material.

Therefore, the plastic composite material molded structure 100 according to an embodiment of the present invention can be manufactured into various components by a press molding method because the clip 7 made of a plastic material can be applied in various ways depending on the shape of the injection member 60.

Further, the plastic composite material molded structure 100 according to an embodiment of the present invention can enable an automated assembly process of components and improve assemblability and recyclability of components because the clip 7 made of a plastic material can be attached and detached with respect to the injection member 60.

Furthermore, according to the plastic composite material molded structure 100 according to an embodiment of the present invention, a structure in which the injection member 60 is inserted in the boss portion 40 is provided, so incomplete molding and poor molding of the boss portion 40 can be minimized.

While embodiments of this invention have been described in connection with what is presently considered to be practical embodiments, it is to be understood that the embodiments of the invention are not limited to the disclosed embodiments. On the contrary, it is intended to cover various modifications and equivalent arrangements included within the spirit and scope of the appended claims.

The following reference identifiers may be used in connection with the drawings to describe various features of embodiments of the present invention.

| | |
|---|---|
| 1: correlated component | 3: panel component |
| 5: fastening member | 7: clip |
| 11: composite material molding source | 12: fiber material |
| 13: press mold | 13a: lower mold |
| 13b: upper mold | 15: mold pin |
| 16: head portion | 17: first pin portion |
| 19: second pin portion | 20: molded main body |
| 40: boss portion | 60: injection member |
| 61: upper portion | 63: middle portion |
| 65: lower portion | 67: fastening hole |
| 69: undercut | 71: inner space |
| 73: fitting groove | |
| 100: plastic composite material molded structure | |
| D1: inner diameter of inner space | D2: inner diameter of fastening hole |
| D3: inner diameter of fitting groove | d1: outer diameter of first pin portion |
| d2: outer diameter of second pin portion | |

What is claimed is:

1. A plastic composite material molded structure configured to be fastened to a correlated component by a fastening member, the plastic composite material molded structure comprising:
- a molded main body comprising a composite material molding source molded into a predetermined shape by a press mold;
- a boss portion protruding from the molded main body; and
- an injection member comprising a plastic material, the injection member being inserted and fixed in the boss portion by a mold pin and having an undercut disposed to be fastened to the fastening member.

2. The plastic composite material molded structure of claim 1, wherein the injection member comprises:
- an upper portion comprising the undercut and a fastening hole into which the mold pin is to be fitted;
- a middle portion extending from the upper portion and having an inner space connected to the fastening hole; and
- a lower portion extending from the middle portion and having a fitting groove into which the mold pin is to be fitted.

3. The plastic composite material molded structure of claim 2, wherein the undercut is disposed at an edge portion of the fastening hole.

4. The plastic composite material molded structure of claim 2, wherein the mold pin comprises a first pin portion and a second pin portion connected to each other, and wherein the mold pin fits into the fastening hole.

5. The plastic composite material molded structure of claim 4, wherein:

an inner diameter of the inner space of the injection member is greater than an inner diameter of the fastening hole; and an inner diameter of the fitting groove is smaller than the inner diameter of the fastening hole.

6. The plastic composite material molded structure of claim 5, wherein the first pin portion having an outer diameter greater than the inner diameter of the fastening hole is to be fitted into the fastening hole.

7. The plastic composite material molded structure of claim 6, wherein the second pin portion having an outer diameter smaller than the outer diameter of the first pin portion and larger than the inner diameter of the fitting groove is fitted into the fitting groove.

8. The plastic composite material molded structure of claim 1, wherein:

the composite material molding source comprises a thermosetting material comprising a fiber material; and the injection member comprises a thermoplastic plastic material.

9. The plastic composite material molded structure of claim 1, wherein the fastening member comprises a clip comprising a plastic material, and wherein the fastening member is fastened to the undercut.

10. The plastic composite material molded structure of claim 1, wherein the plastic composite material molded structure comprises a hood panel.

11. A method of forming a plastic composite material molded structure to be fastened to a correlated component by a fastening member, the method comprising:

injecting a composite material molding source into a lower mold of a press mold, wherein the composite material molding source is a gel material;

molding a molded main body and a boss portion on an upper surface of the molded main body by pressing an upper mold of the press mold to the lower mold and flowing the composite material molding source, wherein a mold pin is disposed on a lower surface of the upper mold and an injection member comprising a plastic material is secured to the mold pin, wherein the injection member is inserted into the boss portion by the molding, and wherein the injection member comprises an undercut that receives the fastening member; and removing the upper mold from the lower mold, wherein the mold pin is separated from the injection member by the removing.

12. The method of claim 11, wherein prior to molding the molded main body and the boss portion, the injection member comprises:

an upper portion comprising the undercut and a fastening hole into which the mold pin is fitted;

a middle portion extending from the upper portion and having an inner space connected to the fastening hole; and a lower portion extending from the middle portion and having a fitting groove into which the mold pin is fitted.

13. The method of claim 12, wherein the undercut is disposed at an edge portion of the fastening hole.

14. The method of claim 12, wherein the mold pin comprises a first pin portion and a second pin portion connected to each other, and wherein the mold pin fits into the fastening hole.

15. The method of claim 14, wherein:

an inner diameter of the inner space of the injection member is greater than an inner diameter of the fastening hole; and an inner diameter of the fitting groove is smaller than the inner diameter of the fastening hole.

16. The method of claim 15, wherein an outer diameter of the first pin portion is greater than the inner diameter of the fastening hole.

17. The method of claim 16, wherein the first pin portion fits into the fastening hole.

18. The method of claim 11, wherein:

the composite material molding source comprises a thermosetting material comprising a fiber material; and the injection member comprises a thermoplastic plastic material.

19. The method of claim 11, wherein the fastening member comprises a clip comprising a plastic material, and wherein the fastening member is fastened to the undercut.

20. The method of claim 11, wherein the plastic composite material molded structure comprises a hood panel.

* * * * *